United States Patent
Savolainen et al.

(10) Patent No.: US 7,600,426 B2
(45) Date of Patent: Oct. 13, 2009

(54) CALIBRATION METHOD AND APPARATUS FOR A MOBILE DEVICE

(75) Inventors: Tapio Savolainen, Helsinki (FI); Veikko Matti Koivumaa, Espoo (FI); Michael Miettinen, Tuusula (FI); Mikko Tuomas Ahlström, Helsinki (FI); Mikko Martikka, Vantaa (FI); Markus Kemetter, Helsinki (FI); Ville-Juhana Mattila, Espoo (FI); Erik Lindman, Espoo (FI)

(73) Assignee: Suunto OY, Vantaa (FI)

( * ) Notice: Subject to any disclaimer, the term of this patent is extended or adjusted under 35 U.S.C. 154(b) by 0 days.

(21) Appl. No.: 12/153,506

(22) Filed: May 20, 2008

(65) Prior Publication Data

US 2008/0289415 A1    Nov. 27, 2008

(30) Foreign Application Priority Data

May 21, 2007    (FI)    ................................. 20075364

(51) Int. Cl.
    *G01C 5/06*    (2006.01)
(52) U.S. Cl. ........................................ 73/384; 701/213
(58) Field of Classification Search .................... 73/384; 701/213
    See application file for complete search history.

(56) References Cited

U.S. PATENT DOCUMENTS

| | | | |
|---|---|---|---|
| 6,381,540 B1 * | 4/2002 | Beason et al. ............... | 701/213 |
| 6,434,485 B1 * | 8/2002 | Beason et al. ............... | 701/213 |
| 6,529,827 B1 * | 3/2003 | Beason et al. ............... | 701/213 |
| 6,678,629 B2 | 1/2004 | Tsuji et al. | |
| 6,678,630 B1 | 1/2004 | Joder et al. | |
| 6,754,137 B1 * | 6/2004 | Bourquin et al. ............... | 368/11 |
| 6,845,323 B1 * | 1/2005 | Beason et al. ............... | 701/213 |
| 6,862,525 B1 | 3/2005 | Beason et al. | |
| 2004/0003472 A1 | 1/2004 | Dallas et al. | |
| 2006/0066295 A1 | 3/2006 | Tamura et al. | |

FOREIGN PATENT DOCUMENTS

| | | |
|---|---|---|
| JP | 8-261755 A | 10/1996 |
| JP | 8-285582 A | 11/1996 |
| WO | WO-2007/009618 A1 | 1/2007 |

* cited by examiner

*Primary Examiner*—Andre J Allen
(74) *Attorney, Agent, or Firm*—Birch, Stewart, Kolasch & Birch, LLP

(57) ABSTRACT

The invention relates to a method and a mobile device. In accordance with the method—pressure data is measured, the pressure data is used as atmospheric-pressure data and/or for the definition of altitude, and the magnetic field of the Earth is measured by a magnetic sensor (22). In accordance with the invention consecutive measurements are performed using the magnetic sensor (22) and the consecutive measurement results are compared, and on the basis of the comparison the mobile device (20) is commanded to either atmospheric-pressure measurement or altitude measurement.

20 Claims, 2 Drawing Sheets

CALIBRATION METHOD AND APPARATUS FOR A MOBILE DEVICE

The present invention relates to a calibration method, according to the preamble of claim 1, for the altitude reading of a mobile device.

The invention also relates to a mobile device.

A method is known from U.S. Pat. publication No. 6,678,630, in which a person's normal routines are used in the calibration of the altitude data of an altimeter measuring pressure. In this publication, the user of the altimeter is assumed to be, for example, at home at a specific time in the morning, and the pre-input altitude data of the home is used for setting the altitude data at a specific moment in time. The use of the method provides reasonable accuracy, but if the routine changes, the calibration will fail completely.

U.S. Pat. publication No. 6,678,629, among others, discloses a solution, in which purely a pressure signal is used to distinguish the change in pressure of the normal atmospheric pressure from a change in the reading of a barometer that arises from the movement of the user of a mobile device, such as a wristop computer. Though the solution also has good features, problems for the precise operation of the apparatus are caused, on the one hand, by variations in atmospheric pressure arising from rapid changes in the weather and, on the other hand, by variations arising from movement, which are not sufficiently rapid to be distinguished from variations in atmospheric pressure.

The use of an acceleration sensor for detecting movement is also known from Japanese application publications 8-285582 and 8-261755. These publications are referred to in, among others, the aforementioned US patent publication. The information obtained from an acceleration sensor is unreliable, and acceleration sensors are not available in all wristop computers.

The invention is intended to eliminate the defects of the state of the art disclosed above and for this purpose create an entirely new type of method and apparatus for calibrating the altitude data of an altitude meter based on a pressure signal, or for retarding a change.

The invention is based on using a magnetic sensor for detecting movement, magnetic sensors being typically in wristop computers that include a compass.

The signal is measured from the magnetic sensor at pre-defined intervals of time and, if the value of the magnetic field does not change, it is assumed that the position remains constant. In other words, when the signal is unchanged, it is assumed that the altitude data remains constant and the variation in pressure is caused by a change in atmospheric pressure. On the basis of an evaluating comparison, the mobile device (20) is commanded to make either an atmospheric-pressure measurement or an altitude measurement, or else a desired altitude is set for the mobile device.

More specifically, the method according to the invention is characterized by what is stated in the characterizing portion of claim 1.

The mobile device according to the invention is, for its part, characterized by what is stated in the characterizing portion of claim 8.

With the aid of the invention, the moments in time, when the altitude data of the user of the mobile device does not change in reality, are reliably determined. In this way it is possible to distinguish a change in atmospheric pressure caused by a change in weather from the effect on atmospheric pressure caused by movement.

By also adding time information, which is available in a mobile device, to the signal of the magnetic sensor, an even more precise result is obtained for distinguishing the altitude data and variations in weather from each other.

In the following, the invention is examined with the aid of examples and with reference to the accompanying drawings.

In the present application, the term mobile device typically refers to a wristop computer, however, according to other preferred embodiments of the invention, the mobile device can be, for example, some other personal mobile device, such as a car compass, or a weather station, a combination device containing an altimeter, a barometer, and a compass, or some other device to be attached to a vehicle.

Figure 2:
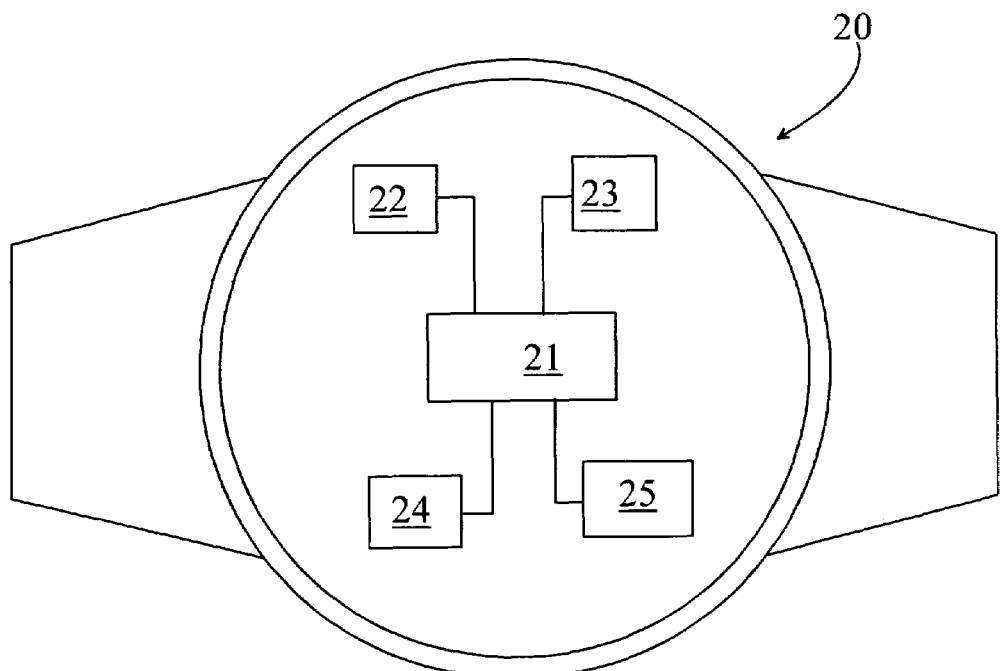
FIG. 2 shows schematically the mobile device according to the invention, preferably a wristop computer.

The pressure sensor 23 of the mobile device according to FIG. 2, preferably a wristop computer 20, is used for measuring both the prevailing atmospheric pressure and altitude. Generally, the user can select either altitude or atmospheric-pressure measurement. If atmospheric-pressure measurement is selected, the altitude data stored in the memory 24 of the mobile device 20 does not change and the pressure data is measured directly. Correspondingly, if altitude measurement is selected, the atmospheric-pressure data stored in the memory 24 of the mobile device remains constant and the pressure variable measured using the pressure sensor 23 becomes an altitude reading, which is calculated from the change in the pressure data with the aid of a processor 21. With the aid of the invention, it is thus possible to automate the selection of altitude/atmospheric-pressure measurement, by combining the measurement data of the magnetic sensor 22 with the measurement data of the pressure sensor 23. The magnetic sensor 22 can be, for example, part of the compass or the compass signal as such. The magnetic sensor can be implemented by any technique whatever known to one skilled in the art. For example, the compass circuit can be implemented by forming a magneto-resistive bridge measuring the magnetic field in two different directions. Alternatively, the magnetic sensor can be implemented by means of a solution, in which there is a compass needle or moving part similar to a compass rose, the position of which is measured. In the figure, block 25 represents other possible sensors, such as acceleration, temperature, or humidity sensors. In addition, the mobile device 20 can typically act as a clock, in which case it will include a clock circuit connection to the control device. The clock data can be used to check not only the magnetic data, but also the data of the altitude sensor.

Figure 1:
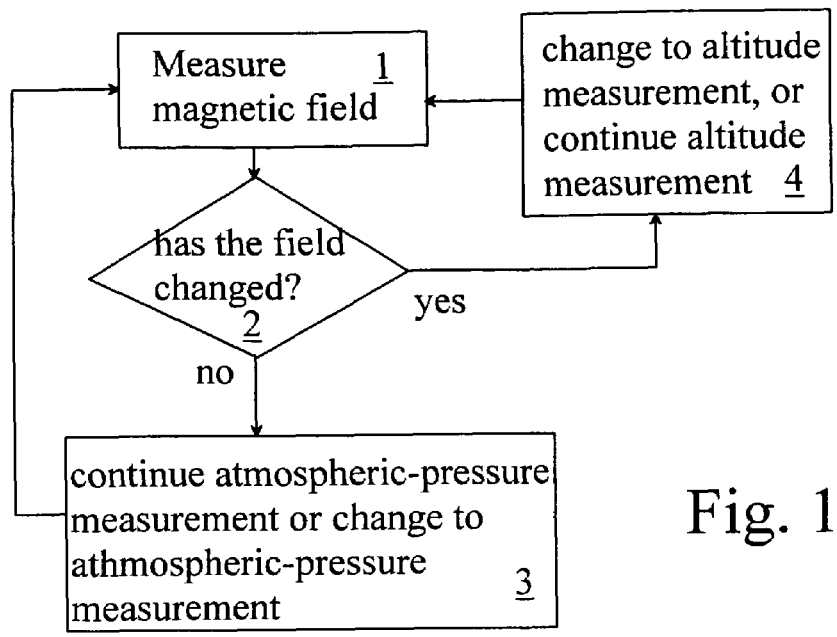
FIG. 1 shows one algorithm according to the invention as a flow diagram.

According to FIG. 1, with reference to the numbering of FIG. 2 the invention is formed of the following operations:

The magnetic sensor 22 of the wristop computer 20 is used to measure according to block 1 magnetic signals repeatedly, for example at intervals of 5-30 minutes. When the user is at rest, the signal of the magnetic sensor does not change and thus it can be assumed that the altitude position remains constant. On the basis of the comparison block 2, it is determined in the processor 21, on the basis of the data of the memory 24, whether the results of the consecutive measurements of the magnetic sensor 22 are at least approximately of a similar magnitude. If there are no substantial changes, either the atmospheric-pressure measurement state is continued, or alternatively the pressure sensor 23 of the mobile device 20 is commanded to the atmospheric-pressure measuring state according to block 3, in which case the altitude reading remains unchanged.

If changes in the measurement of the magnetic field are detected, and are ascertained to be real, either the altitude measurement is continued, or a move is made to the measurement of altitude and the atmospheric-pressure reading is preserved unchanged stored in the memory 24. The memory 24 can also be integrated in the processor 21.

In order to improve the accuracy of measurement, the following operations can be performed. If the measurement result of the magnetic sensor 22 changes from the previous measurement, a change can be made to the comparison state, and the results of the following measurement still waited for. If it is ascertained that the change is real, the pressure sensor is switched from the measurement of atmospheric pressure to the measurement of altitude. By means of this procedure, it is possible to reduce the effect of individual disturbances. In order to make the measurement results more precise, whenever a change takes place in the magnetic signal both the pressure and magnetic-sensor data can be recorded in the memory 24, in which case, despite the check stage of the change described above, it is possible to return to the pressure data of the first magnetic-measurement change and the altitude or pressure data can be defined according to it.

The control data can be ensured with the aid of clock data. If the change in magnetic field measured by the magnetic sensor 22 is in the boundary area, and the change takes place at such a time relative to the routines of the user when an altitude change does not normally take place (for example at night), such a change can be filtered out and the atmospheric-pressure measurement continued.

Changes in the reading of the magnetic sensor 22 are caused precisely by a change in the attitude of the mobile device. The magnetic signal is at its strongest when the measuring direction of the magnetic sensor 22 is parallel to the magnetic flux travelling through the device. The magnetic flux travelling through the device is the sum of the flux of the earth's magnetic field and possible magnetic disturbances.

Changes to the reading of the magnetic sensor are also caused by magnetic objects, for example, vehicles (cars, etc.).

Figure 3:
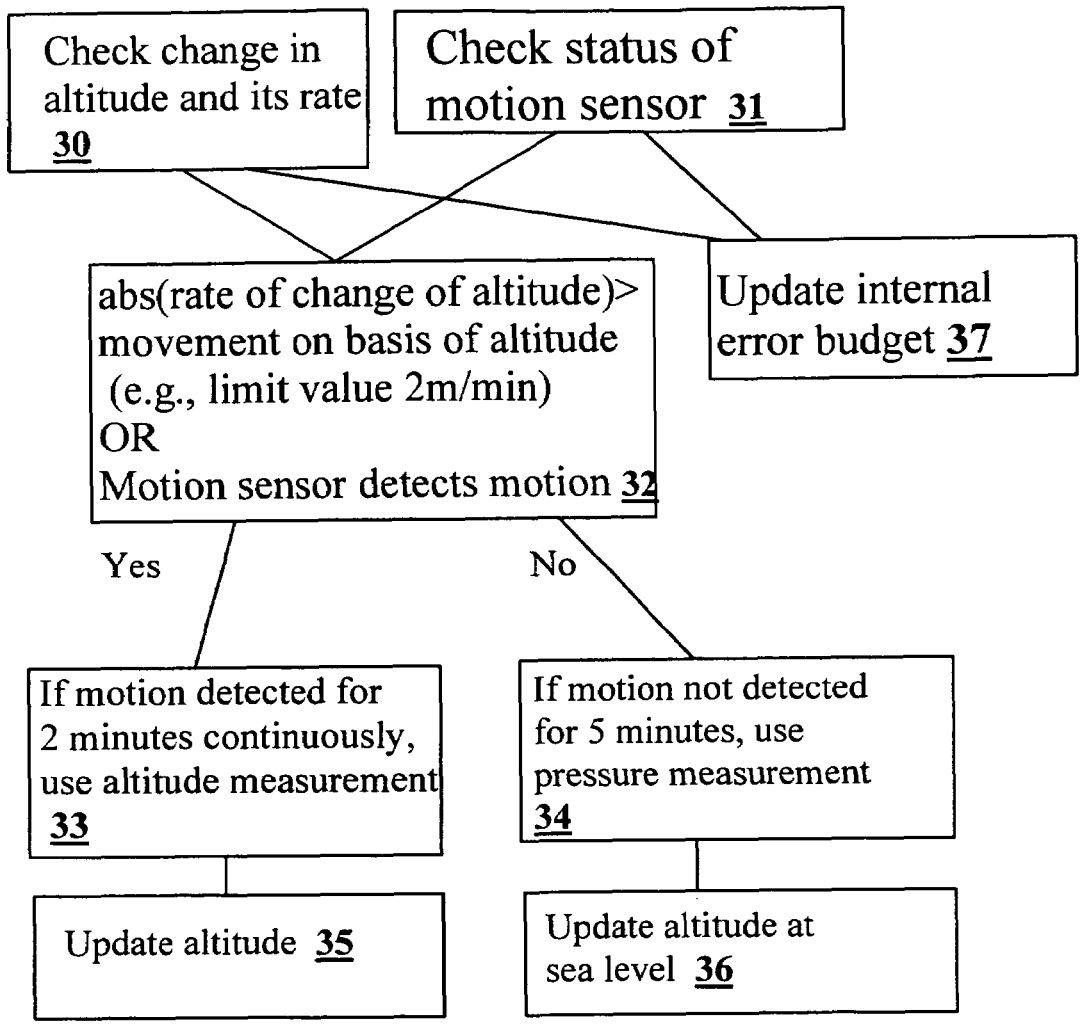
FIG. 3 shows a second algorithm according to the invention as a flow diagram.

According to FIG. 3, one preferred embodiment of the invention can be described as follows. The rate of change of altitude is defined in block 30 and the status of the motion sensor in block 31. The internal error budget of blocks 30 and 31 is kept up to date in block 37. In block 32, an estimate is made as to whether the rate of change of altitude is greater than a limit value, or whether the motion sensor is detecting motion. One suitable limit value for the rate of change of altitude is 2 m/min.

If the answer to either of these is yes, a move is made to block 33 and an estimate is made as to whether the said condition has been in force for at least a predefined period of time, for example, more than two minutes. If the condition of block 33 is realized, a move is made to altitude measurement and the altitude data is updated in block 35. The altitude data is updated starting from the situation in block 32.

If both answers in block 32 are no, a move is made to block 34 and the situation is monitored for a predefined period of time, for example 5 minutes and, if the conditions of block 32 are still in force (the no condition) the pressure-measurement function is used. According to block 36, the reference-level pressure or reference pressure is updated, the reference level being typically sea level.

According to the invention, for example, for a person sleeping in a permanent dwelling, the motion sensor will always give the same reading and, according to the algorithms presented above, the state will be the pressure-measurement function (barometer). A change in position of the sleeping person may give an erroneous signal, which can be eliminated, for example, using the algorithm of block 33 of FIG. 3.

In the case of a car moving over a long plateau, on the other hand, the algorithm described above can change between the altitude-operation state and the pressure-measurement state, according to the above presented principles always, if pressure changes exceeding the limit values occur, or correspondingly if the attitude of the mobile device relative to the Earth's magnetic field changes so much that a change is detected in the motion status of the sensor.

In one preferred embodiment of the invention, the procedure is that, when the device has been stationary for some predefined period of time, the altitude data is set to some predefined altitude, for example, the home altitude.

Thus the invention is intended for precise altitude calibration, but one objective of the invention is also the minimization of altitude error caused by change in the pressure data, in such a way that attention is not paid to a change in altitude, when the device is detected as being stationary. In practice, this thus retards the accumulation of altitude error.

The invention claimed is:

1. Method in a mobile device (20), in which
   pressure data is measured,
   the pressure data is used as atmospheric-pressure data and/or for the definition of altitude, and
   the magnetic field of the Earth is measured by a magnetic sensor (22), characterized in that
   consecutive measurements are performed using the magnetic sensor (22) and the consecutive measurement results are compared, and on the basis of the comparison the mobile device (20) is commanded to either atmospheric-pressure measurement or altitude measurement.

2. Method according to claim 1, characterized in that if the signal of the magnetic sensor (22) does not vary it is assumed that the altitude location remains constant and the mobile device is commanded to atmospheric-pressure measurement and the altitude data is displayed or recorded in the memory.

3. Method according to claim 1, characterized in that, if the signal of the magnetic sensor (22) varies it is assumed that the atmospheric-pressure data remains constant and the mobile device is commanded to altitude measurement and the atmospheric pressure is recorded in the memory.

4. Method according to claim 1, characterized in that time data is used to ensure the result of the magnetic measurement.

5. Method according to claim 1, characterized in that before the decision on the selection of the manner of measurement, several magnetic measurements are made, in order to filter out erroneous measurements.

6. Method according to claim 1, characterized in that, when the first change is detected in the magnetic measurement, the pairs of pressure/magnetic measurements are recorded in the memory (24) of the mobile device (20).

7. Method according to claim 1, characterized in that, when the device has been stationary for some predefined period of time, some predefined altitude is set as the altitude data.

8. Mobile device (20), which comprises
   means (23) for measuring pressure,
   means (21) for using the pressure data as atmospheric-pressure data and/or as altitude-level data, and
   measuring means (22) for measuring the magnetic field of the Earth,
   characterized in that the mobile device comprises
   means (22, 21) for performing consecutive measurements using the means for measuring the magnetic field of the Earth and
   means (21, 24) for comparing the consecutive measurement results and, on the basis of the comparison, for commanding the mobile device (20) to either atmospheric-pressure measurement or altitude measurement.

9. Mobile device (20) according to claim 8, characterized in that it comprises means (21) to command the mobile device to atmospheric-pressure measurement and the altitude data is displayed, or recorded in the memory, if the signal of the magnetic sensor (22) does not change.

10. Mobile device (20) according to claim 8, characterized in that it comprises means (21) to command the mobile device to altitude measurement, if the signal of the magnetic sensor (22) changes.

11. Mobile device (20) according to claim 1, characterized in that it comprises means (21) for using time data to ensure the result of the magnetic measurement.

12. Mobile device (20) according to claim 1, characterized in that it comprises, for filtering out erroneous measurements, means (21) for making several magnetic measurements, before a decision on the selection of the manner of measurement.

13. Mobile device (20) according to claim 1, characterized in that it comprises means (21) for recording pairs of pressure/magnetic measurement data in the memory (24) of the mobile device (20), when the first change is detected in the magnetic measurement.

14. Mobile device according to claim 1, characterized in that it comprises setting means for setting the altitude data to a predefined altitude, when the device has been stationary for some predefined period of time.

15. Method according to claim 2, characterized in that, if the signal of the magnetic sensor (22) varies it is assumed that the atmospheric-pressure data remains constant and the mobile device is commanded to altitude measurement and the atmospheric pressure is recorded in the memory.

16. Method according to claim 2, characterized in that time data is used to ensure the result of the magnetic measurement.

17. Method according to claim 3, characterized in that time data is used to ensure the result of the magnetic measurement.

18. Method according to claim 2, characterized in that before the decision on the selection of the manner of measurement, several magnetic measurements are made, in order to filter out erroneous measurements.

19. Method according to claim 3, characterized in that before the decision on the selection of the manner of measurement, several magnetic measurements are made, in order to filter out erroneous measurements.

20. Method according to claim 4, characterized in that before the decision on the selection of the manner of measurement, several magnetic measurements are made, in order to filter out erroneous measurements.

* * * * *